(12) United States Patent
Kueperkoch et al.

(10) Patent No.: US 9,841,764 B2
(45) Date of Patent: Dec. 12, 2017

(54) PREDICTIVE CONTROL OF A MOTOR VEHICLE

(71) Applicant: Robert Bosch GmbH, Stuttgart (DE)

(72) Inventors: Stefan Kueperkoch, Heilbronn (DE); Jeannine Schwarzkopf, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 126 days.

(21) Appl. No.: 14/897,278

(22) PCT Filed: Apr. 16, 2014

(86) PCT No.: PCT/EP2014/057690
§ 371 (c)(1),
(2) Date: Mar. 15, 2016

(87) PCT Pub. No.: WO2014/198440
PCT Pub. Date: Dec. 18, 2014

(65) Prior Publication Data
US 2016/0187884 A1 Jun. 30, 2016

(30) Foreign Application Priority Data
Jun. 12, 2013 (DE) ........................ 10 2013 210 923

(51) Int. Cl.
*G01C 22/00* (2006.01)
*G05D 1/02* (2006.01)
(Continued)

(52) U.S. Cl.
CPC ......... *G05D 1/0212* (2013.01); *B60W 30/165* (2013.01); *B62D 15/025* (2013.01); *B62D 15/0265* (2013.01); *G08G 1/163* (2013.01); *G08G 1/166* (2013.01); *G08G 1/22* (2013.01); *G08G 1/09623* (2013.01); *G08G 1/096716* (2013.01); *G08G 1/096725* (2013.01); *G08G 1/096791* (2013.01)

(58) Field of Classification Search
CPC .... G06K 9/00798; B60T 8/246; B62D 15/025
USPC .......................... 701/1, 23, 41, 301; 180/271
See application file for complete search history.

(56) References Cited

U.S. PATENT DOCUMENTS 9,026,308 B2* 5/2015 Gordh ................. B60W 30/182
701/36
2006/0095195 A1 5/2006 Nishimura et al.
2010/0246889 A1* 9/2010 Nara .................. G06K 9/00798
382/104

FOREIGN PATENT DOCUMENTS

DE 10 2006 012997 9/2007
DE 10 2007 050189 4/2009
(Continued)

OTHER PUBLICATIONS

International Search Report for PCT/EP2014/057690, dated Aug. 29, 2014.

*Primary Examiner* — Gertrude Arthur Jeanglaude
(74) *Attorney, Agent, or Firm* — Norton Rose Fulbright US LLP; Gerard Messina

(57) ABSTRACT

A method for controlling a motor vehicle includes: ascertaining a driving strategy as a function of an environment; detecting a driving strategy of a motor vehicle driving ahead; ascertaining that the driving strategies deviate from each other; and controlling the motor vehicle in accordance with the driving strategy of the motor vehicle driving ahead.

16 Claims, 7 Drawing Sheets

(51) Int. Cl.
  *B62D 15/02* (2006.01)
  *B60W 30/165* (2012.01)
  *G08G 1/16* (2006.01)
  *G08G 1/00* (2006.01)
  G08G 1/0962 (2006.01)
  G08G 1/0967 (2006.01)

(56) References Cited

FOREIGN PATENT DOCUMENTS

| | | |
|---|---|---|
| DE | 102012009238 A1 | 11/2012 |
| EP | 1 096 457 | 5/2001 |
| EP | 10 2012 009238 | 11/2012 |
| JP | 2001043498 A | 2/2001 |
| JP | 2004078333 A | 3/2004 |
| JP | 2008207729 A | 9/2008 |
| WO | WO 2009/103388 | 8/2009 |

\* cited by examiner

PREDICTIVE CONTROL OF A MOTOR VEHICLE

BACKGROUND OF THE INVENTION

1. Field of the Invention

The present invention relates to the control of a motor vehicle. In particular, the invention relates to the control of a vehicle in an environment with other motor vehicles.

2. Description of the Related Art

An assistance system for a driver of a motor vehicle is designed to assist the driver in controlling the vehicle in the linear and lateral directions. For example, a brake assistance can trigger emergency braking, in which the linear speed of the vehicle is reduced. In another example, an electronic stability program (ESP) may ensure that the driving stability of the motor vehicle is stabilized in the lateral direction through a steering or braking intervention.

Some assistance systems, e.g., a parking assistant, do not intervene in the steering of the motor vehicle directly, but output a signal to the vehicle's driver in order to point out a potential danger. Other assistance systems, such as the mentioned brake assistant, are able to intervene in the control of the motor vehicle and can normally not be deactivated by the driver. Yet other driver assistance systems induce a partially or completely autonomous guidance of the vehicle, so that, if at all, there is barely any need for the driver to intervene in the control. The driver of the motor vehicle can usually interact with the system in order to achieve an optimized vehicle control.

The function of most driver assistance systems is restricted to data that lie within a detection range of a sensor on board of the motor vehicle or are available in the form of stored information, e.g., as map data. Supplementary information is transmitted between individual motor vehicles in some instances as well in order to make current circumstances within an area available immediately. Nevertheless, there is often not enough information at hand for managing the best possible control of the motor vehicle in a partially or fully automatic manner. For example, an unexpected obstacle that the sensors on board of the motor vehicle are unable to detect, cannot be used for ascertaining a driving strategy for the vehicle.

BRIEF SUMMARY OF THE INVENTION

Therefore, the present invention is based on the objective of providing an improved method, a computer program product and a device for the improved control of a motor vehicle.

A method for controlling a motor vehicle according to the invention includes steps of ascertaining a driving strategy as a function of an environment; detecting a driving strategy of a motor vehicle driving ahead; ascertaining that the driving strategies deviate from each other; and controlling the motor vehicle in accordance with the driving strategy of the motor vehicle driving ahead.

This makes it possible to guide the motor vehicle according to the preceding motor vehicle in order to profit from the observations that resulted in a changed driving strategy in the motor vehicle traveling ahead. This behavior resembles that of a novice driver who adapts his or her driving strategy to the surrounding motor vehicles. Information that is available on board of the preceding motor vehicle but not in the motor vehicle to be controlled must thereby not be scanned for arriving at a decision and to be forwarded to the motor vehicle to be controlled; instead, a control of the motor vehicle is based on the observed driving strategy of the vehicle driving ahead. A data transmission and, in particular, the installation of a device for scanning information and for the information transmission in the vehicle driving ahead may thus be unnecessary. In particular, it may be unimportant whether the preceding vehicle is controlled by a driver or a driver assistance system.

In one preferred specific embodiment, driving strategies of a plurality of motor vehicles driving ahead are ascertained and the motor vehicle is controlled in accordance with one of these strategies if the driving strategies correspond to one another and deviate from the ascertained driving strategy. Taking the driving strategies of multiple motor vehicles into account makes it easier to avoid the adoption of a driving mistake or an incorrectly selected driving strategy of the vehicle driving ahead.

In one especially preferred specific embodiment, a control recommendation for another vehicle, derived from the driving strategy of the motor vehicle driving ahead, is provided in addition. The supply in particular may include a transmission of the control recommendation to a central instance, e.g., within what is known as a computer cloud, or to surrounding motor vehicles with the aid of a car-to-car communication (car-to-car infrastructure, C2C) or a car-to-infrastructure communication (C2I).

In another variant, which is combinable with the previously mentioned variant, the control recommendation can also be stored. If the motor vehicle subsequently travels past the same location again, the motor vehicle is controllable on the basis of the stored recommendation. In this way especially information that applies in the medium or long term, such as information about road work or road damage, is able to be used for controlling the motor vehicle. For example, when passing the same location again, it is possible to use an optimized driving strategy even when no preceding vehicle happens to be available.

In one further specific embodiment, the driving strategy of the motor vehicle driving ahead is checked with regard to a danger potential, and the motor vehicle will then be controlled according to the driving strategy of the preceding vehicle only if the danger potential is lower than a predefined threshold value. This makes it possible to minimize a danger to the motor vehicle by a driving strategy that would otherwise not have been selected on the basis of the information available on board of the motor vehicle. Especially random or incorrect behavior of the preceding motor vehicle is then unable to influence the driving strategy selected oneself.

In different specific embodiments, the driving strategy may involve a linear control, a lateral control, or both. In this way the most essential driving parameters of the motor vehicles are able to be influenced in a flexible manner. A driving strategy of the vehicle driving ahead that can be recognized from the outside is thereby relatively easily and safely able to be understood or reproduced.

The control preferably includes carrying out an intervention in the linear or lateral control of the motor vehicle. In another specific embodiment, the output of an indication to the driver of the vehicle may occur as well. The indication may correspond to the aforementioned control recommendation. In particular, the indication may relate to the linear or lateral motor vehicle control.

A computer program product according to the invention includes program code means for carrying out the described method when the computer program product is running on a processing device or stored on a computer-readable data carrier.

A device for controlling a motor vehicle according to the present invention includes a first scanning device for scanning an environment, a processing device for ascertaining a driving strategy as a function of the environment, and a second scanning device for scanning a driving strategy of a motor vehicle traveling in front. The processing device is designed to control the motor vehicle according to the driving strategy of the preceding motor vehicle if the driving strategies deviate from one another. The device may include one or more control unit(s), which may already be present on board of a motor vehicle. In this way a known vehicle is able to be retrofitted at little expense in an effort to provide better control of the motor vehicle.

DETAILED DESCRIPTION OF THE INVENTION

Figure 1:
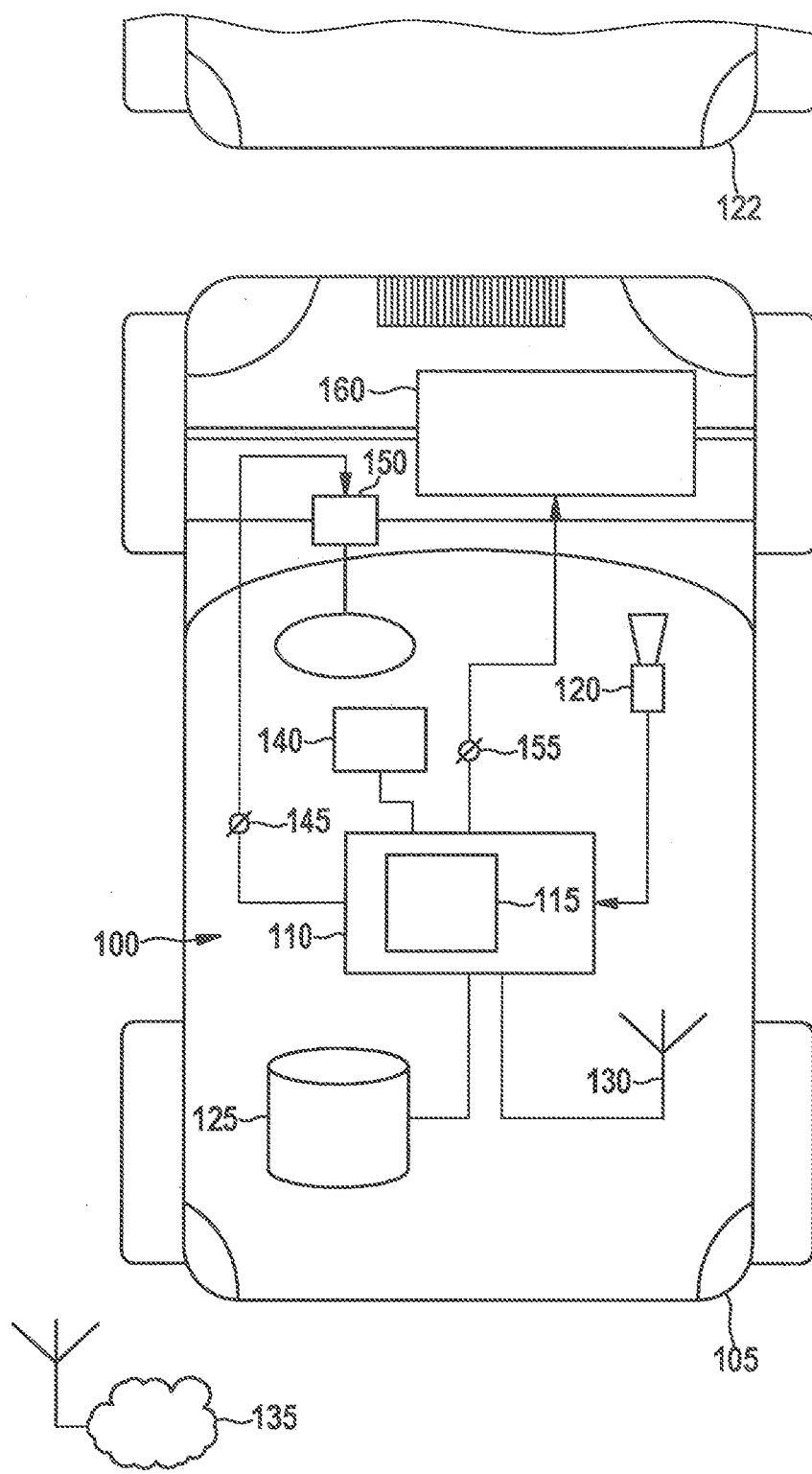
FIG. 1 shows a control device on board of a motor vehicle.

FIG. 1 shows a control device 100 inside a motor vehicle 105. Device 100 includes a processing device 110, which preferably is equipped with a programmable microcomputer 115 for executing a computer program product. In addition, a scanning device 120 for scanning an environment of motor vehicle 105 is provided. Scanning device 120 has a detection range that preferably extends in the driving direction of motor vehicle 105. For example, the scanning device may encompass a camera, a radar sensor, a LIDAR sensor, an ultrasonic sensor or a combination of sensors. As will be explained in greater detail in the further text, a detection device 120 preferably is also designed for scanning an environment of a motor vehicle 122 traveling ahead. Moreover, multiple motor vehicles 122 driving ahead are preferably able to be detected and their driving strategies scanned, or a single motor vehicle 122 is scannable that travels in front of one or more motor vehicle(s) 122 driving ahead.

Control device 100 optionally also includes a data memory 125 for supplying information pertaining in particular to an environment of motor vehicle 105. Data memory 125, for example, may supply map information of the environment of motor vehicle 105. In particular a satellite-based positioning device for ascertaining a position of motor vehicle 105 may be provided in order to improve access to the map information. Based on the ascertained position, information that pertains to the environment of motor vehicle 105 can be read out from data memory 125. Data memory 125 may be part of a satellite navigation system on board of motor vehicle 105.

A transmission device 130 may optionally be provided, as well. Information pertaining to an environment of motor vehicle 105 or a recommendation for control of motor vehicle 105 is able to be transmitted or received with the aid of transmission device 130. A one-sided or two-sided communication with another motor vehicle, an infrastructure or a central instance may take place. In one specific embodiment the information is transmitted to or from what is known as a computer cloud 135, which includes an abstracted computer infrastructure that is dynamically adapted to demand.

Based on the information from scanning device 120, data memory 125 or transmission device 130, processing device 110 determines a driving strategy for motor vehicle 105. The driving strategy may involve a linear and/or lateral control of motor vehicle 105, in particular. In a basic specific embodiment, an output device 140 is provided, which addresses a driver of motor vehicle 105. This makes it possible to offer the driver information on the basis of which the driver himself may initiate the linear or lateral control of vehicle 105 in order to follow the previously determined driving strategy. In another variant, which may be combinable with the described variant of output device 140, processing device 110 may also initiate an automatic or semi-automatic intervention in the linear or lateral control of motor vehicle 105. To do so, a first interface 145 may be provided for a connection to a lateral control 150, in particular a steering system for influencing a driving direction of motor vehicle 105. In addition or as an alternative, a second interface 155 may be provided for a connection to a drive device 160, especially to a drive motor of motor vehicle 105, or to a brake system (not shown). Signals for the linear or speed control of motor vehicle 105 are transmittable by second interface 155. In one specific embodiment, the driver of motor vehicle 105 is also able to override or reassume the influencing of the linear or lateral control of motor vehicle 105 of processing device 110.

Figure 2:
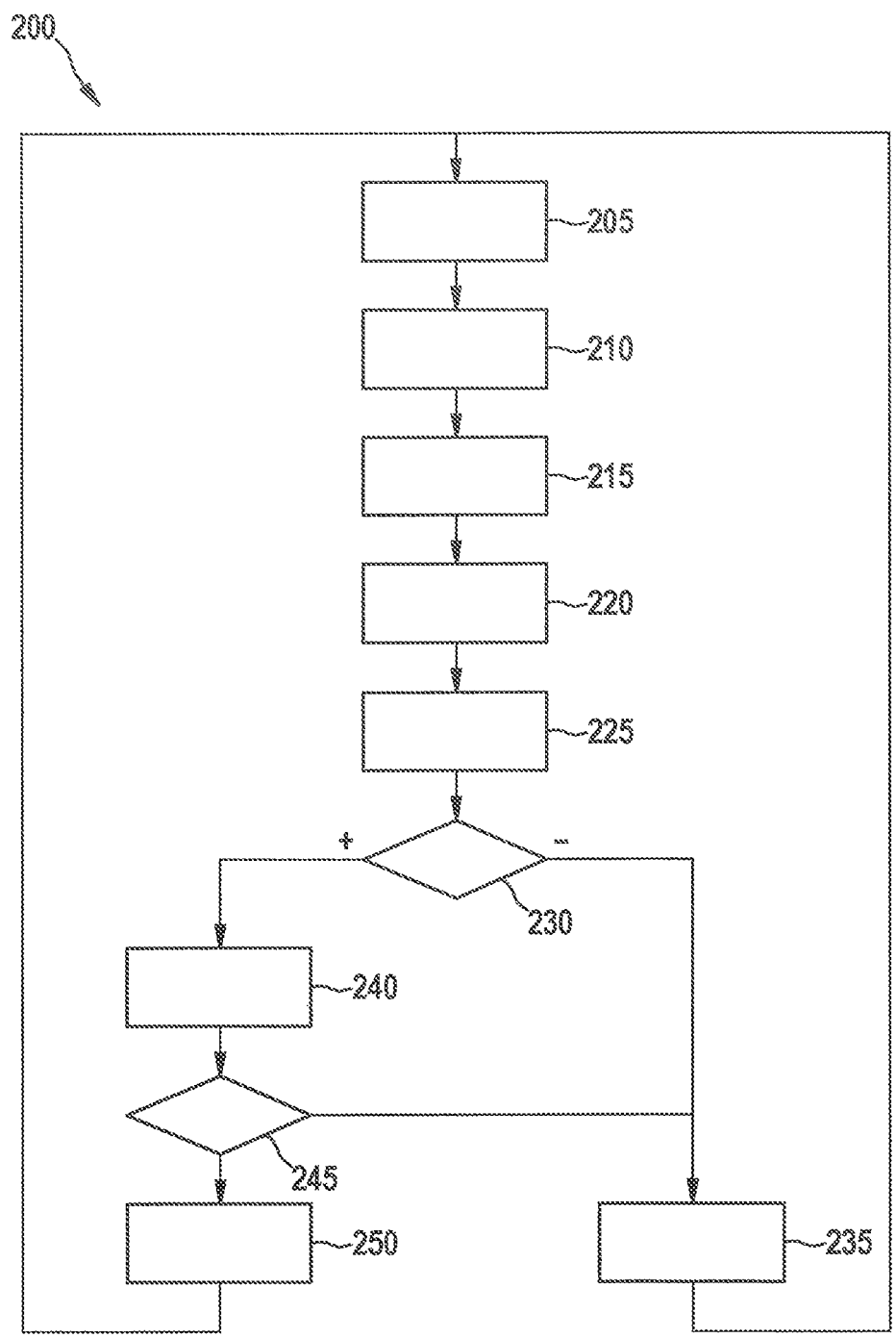
FIG. 2 shows a flow chart of a method for operating the motor vehicle of FIG. 1.

FIG. 2 shows a flow chart of a method 200 for controlling motor vehicle 105 from FIG. 1. Method 200 is set up in particular for running on processing device 110 or programmable microcomputer 115 on board of motor vehicle 105.

Method 200 starts with a step 205, in which an environment of motor vehicle 105 is scanned, in particular with the aid of scanning device 120. Supplementary information, which is retrieved from data memory 125, for example, or received with the aid of transmission device 130, may optionally be provided in a step 210. The supplementary information in particular may include a control recommendation, which was stored during earlier travel in the same location. The control recommendation can also have been supplied by another motor vehicle, which drove along the same spot at an earlier point in time, as will be described in greater detail below with reference to step 240. Based on the compiled information, a driving strategy for motor vehicle 105 is then determined in a step 215. The driving strategy in particular may involve a linear and/or lateral control of motor vehicle 105.

In a step 220, motor vehicle 122 driving in front is scanned, and in a step 225, the driving strategy of vehicle 122 traveling ahead is ascertained. Here, too, especially a linear or lateral control of preceding vehicle 122 may be taken into account.

In a step 230, it is ascertained whether the driving strategy of motor vehicle 105, ascertained in step 215, and the driving strategy of preceding motor vehicle 122, ascertained in step 225, deviate from each other. The clearance between motor vehicle 105 and preceding motor vehicle 122 is preferably taken into account in order to model the time offset of the linear and lateral controls of motor vehicle 105 and 122 while they are traveling along a route.

If no deviation exists, motor vehicle 105, in a step 235, may be guided according to the driving strategy determined in step 215. The control, in particular, may include an output of indications regarding the ascertained driving strategy to a driver via output device 140, or a direct intervention in the linear or lateral control of motor vehicle 105 with the aid of one of interfaces 155 or 145.

However, if different driving strategies were determined in step 230, then a control recommendation that is based on the driving strategy of motor vehicle 122 driving ahead can optionally be made available in a step 240. The control recommendation preferably represents an abstraction of the linear or lateral control of motor vehicle 105 or 122 of vehicle-related parameters, such as a speed, and, for example, may include a recommended trajectory, an area to be avoided, a speed recommendation, or a general warning, e.g., against excessive speed. The control recommendation is storable in data memory 125. In addition or as an alternative, the control recommendation can be transmitted with the aid of transmission device 130 in order to make it available to another motor vehicle 105, which, for example, can evaluate the control recommendation in the manner described earlier with reference to step 210.

In an optional step 245, a danger potential for motor vehicle 105 resulting from the adoption of the driving strategy of motor vehicle 122 driving ahead is able to be ascertained. If, for example, preceding motor vehicle 122 carries out an evasive movement onto an oncoming lane, then it can be ascertained in step 245 whether a danger for motor vehicle 105 by traffic on the oncoming lane would exist at the time at which the evasive maneuver by motor vehicle 105 would take place at the same location. In one specific embodiment, the danger is quantifiable and comparable to a threshold value. If the danger lies above the threshold value, so that a risk resulting from an adoption of the driving strategy of motor vehicle 122 driving ahead is classified as excessive, then method 200 continues with the afore-described step 235. In the other case, if the danger is classified as low enough or the danger determination in step 245 is not performed at all, motor vehicle 105 is controlled in accordance with the driving strategy of motor vehicle 122 driving ahead in a step 250. This step corresponds to step 235, taking a different driving strategy as a basis.

Method 200 may branch back to step 205 and be run through again following one of steps 235 and 250.

Figure 3:
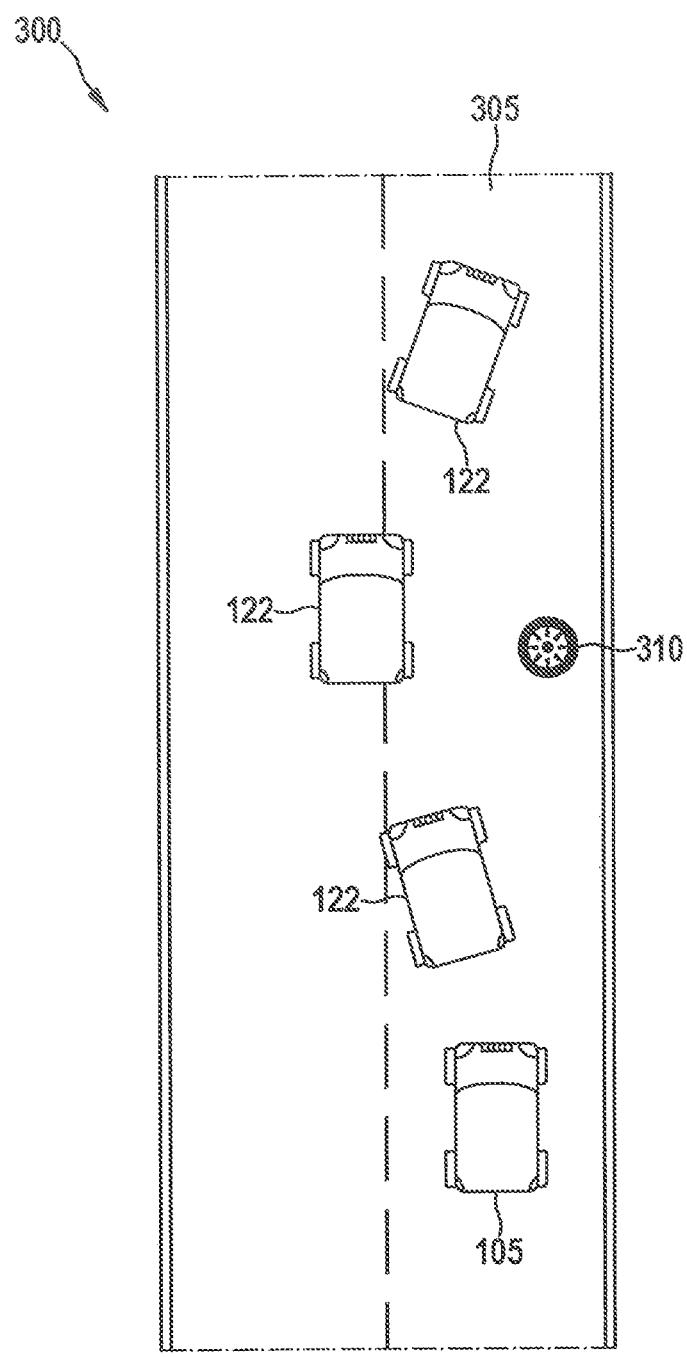
FIGS. 3 to 7 show examples for the control of the motor vehicle of FIG. 1.

FIG. 3 shows a first example for the control of motor vehicle 105 of FIG. 1. Motor vehicle 105 and multiple motor vehicles 122 driving ahead are traveling on a road 305. Motor vehicles 122 traveling ahead drive around an obstacle 310 that is initially unable to be detected on board of motor vehicle 105, such as a burst tire which is lying on the roadway. The driving strategy ascertained on board of motor vehicle 105 would relate to simple straight-ahead driving, for example. However, it can be determined on board of motor vehicle 105 that one or more of preceding motor vehicle(s) 122 opt(s) for a different driving strategy and drive(s) around the area of obstacle 310. This deviation of the self-determined driving strategy and the driving strategies observed on preceding motor vehicles 122 may have the result that the driving strategy determined on one's own will be discarded and motor vehicle 105 instead is guided behind motor vehicles 122.

In one variant, the adoption of the driving strategy of one of motor vehicles 122 driving ahead may be made dependent upon how many preceding motor vehicles 122 exhibit a different driving strategy than the one initially selected on one's own, and whether the driving strategies of preceding motor vehicles 122 are similar. For example, if one of preceding motor vehicles 122 were to pass obstacle 310 on a different side than the other preceding motor vehicles 122, then the adoption of the other driving strategy may depend on which variant the majority of motor vehicles 122 driving ahead prefers. In one other variant, the driving strategy exhibited by motor vehicle 122 driving directly ahead is always adoptable.

Figure 4:
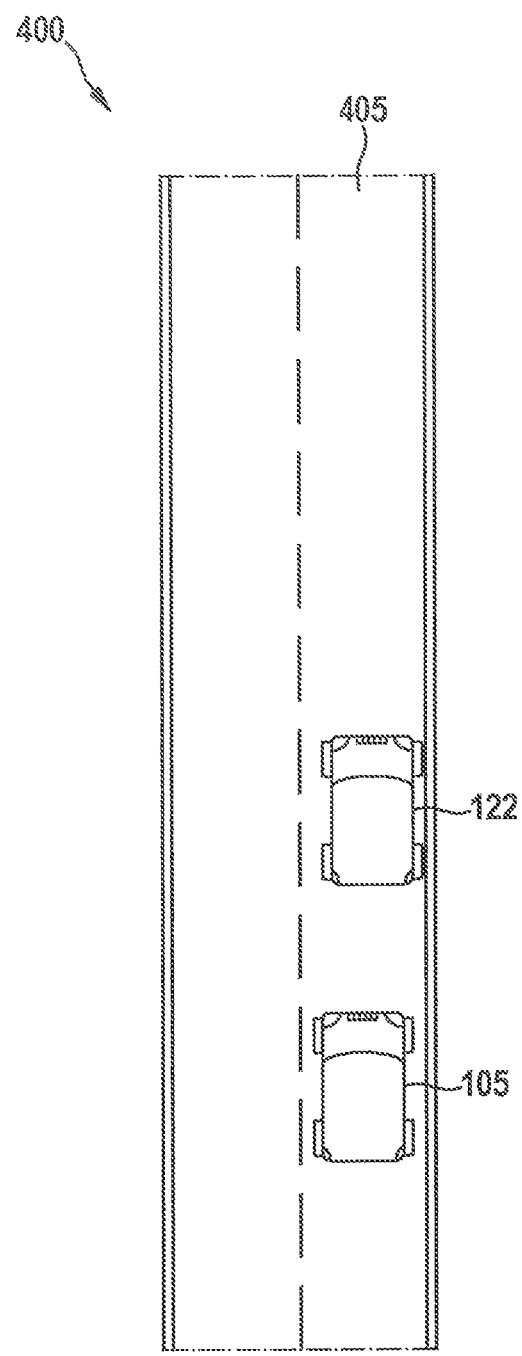

FIG. 4 shows a second example 400 for the control of motor vehicle 105 of FIG. 1. Motor vehicles 105 and 122 travel on a road 405, which is so narrow that if oncoming motor vehicles are encountered, it is useful not to remain in the center of the own lane but to stay in the region of the right roadway shoulder. Preceding motor vehicle 122 can usually detect an oncoming vehicle easier or earlier than motor vehicle 105. As a consequence it appears useful for motor vehicle 105 to then stay at the right roadway shoulder if preceding motor vehicle 122 does the same.

Figure 5:
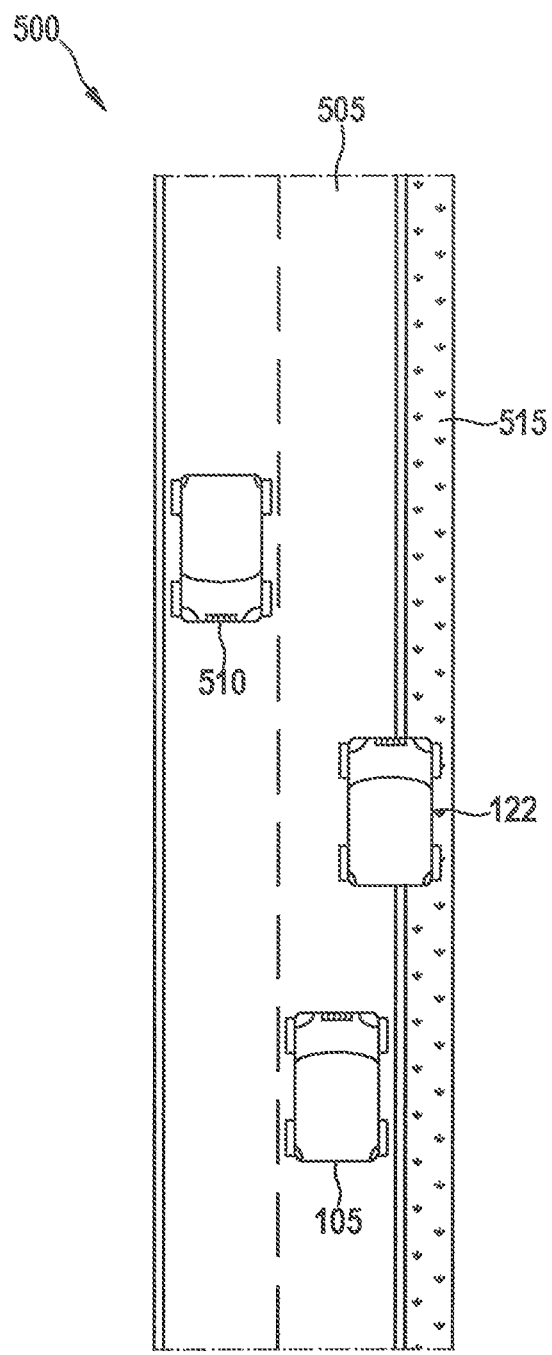

FIG. 5 shows a third example 500 for the control of motor vehicle 105 of FIG. 1. Similar to second example 400 of FIG. 4, motor vehicle 105 and preceding vehicle 122 travel on a road 505. Road 505 is so narrow that an evasive maneuver onto shoulder 515 must be performed in order to be able to pass an oncoming vehicle 510. Adopting the driving strategy of preceding motor vehicle 122 on the part of motor vehicle 105 takes place as described earlier with reference to FIG. 4.

Figure 6:
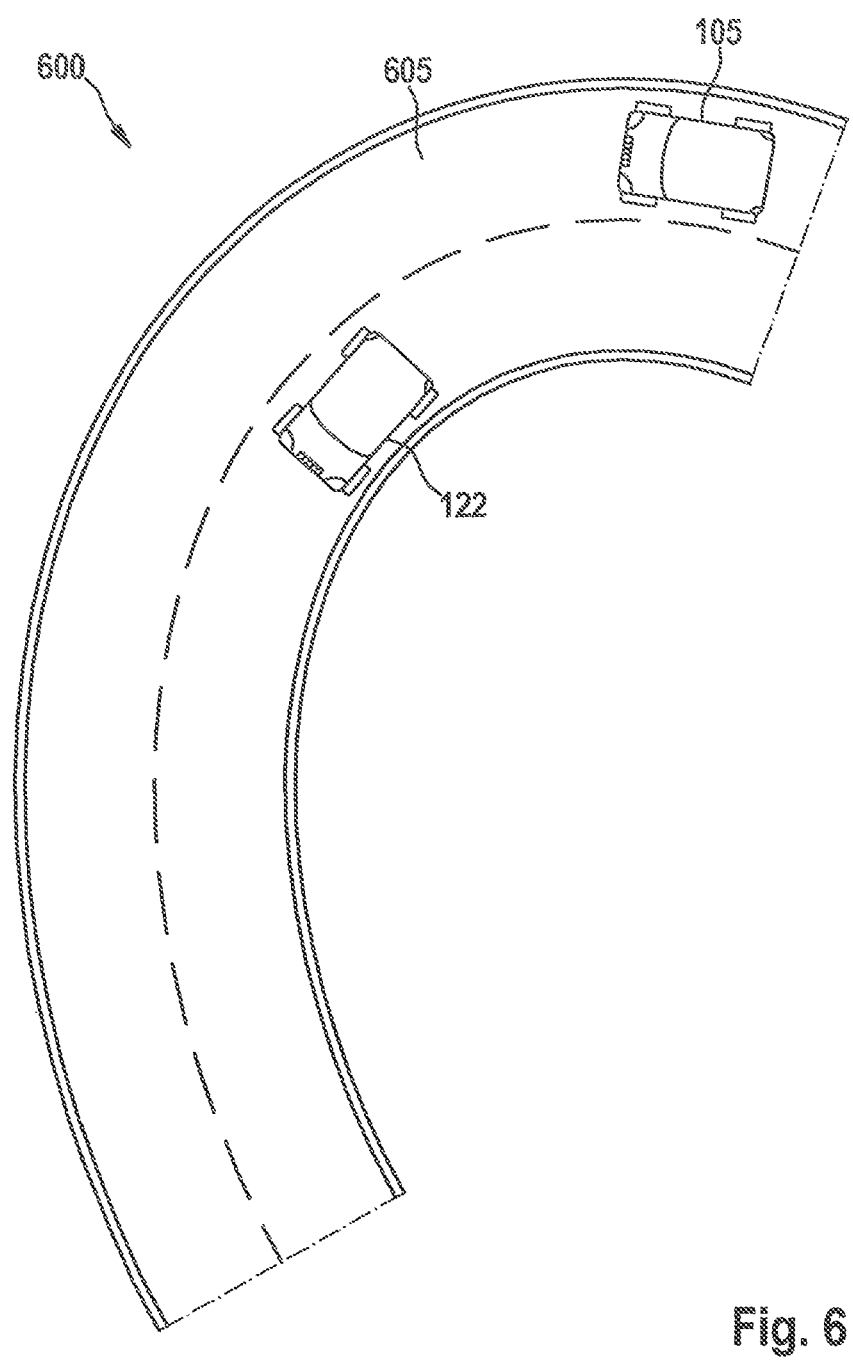

FIG. 6 shows a fourth example for the control of motor vehicle 105 of FIG. 1. Motor vehicle 105 and preceding motor vehicle 122 are traveling on a road 605, which describes a left turn. Preceding motor vehicle 122 has a sufficient view of the extension of road 605 beyond the curve in order to determine that the oncoming traffic lane can be utilized for the cornering, as well. This driving strategy is also known as cutting corners. Observing the driving strategy of motor vehicle 122 makes it possible to infer on board of motor vehicle 105 that no oncoming traffic is currently to be expected, so that the driving strategy of motor vehicle 122 can be adopted. In one specific embodiment, it is not only the trajectory of preceding motor vehicle 122 that is emulated, but the corner cutting is able to start immediately. The driving strategy of preceding motor vehicle 122 thus is shifted back counter to the driving direction in relation to road 605. The adopted driving strategy may therefore have ended earlier by motor vehicle 105 than by motor vehicle 122 with regard to road 605.

Figure 7:
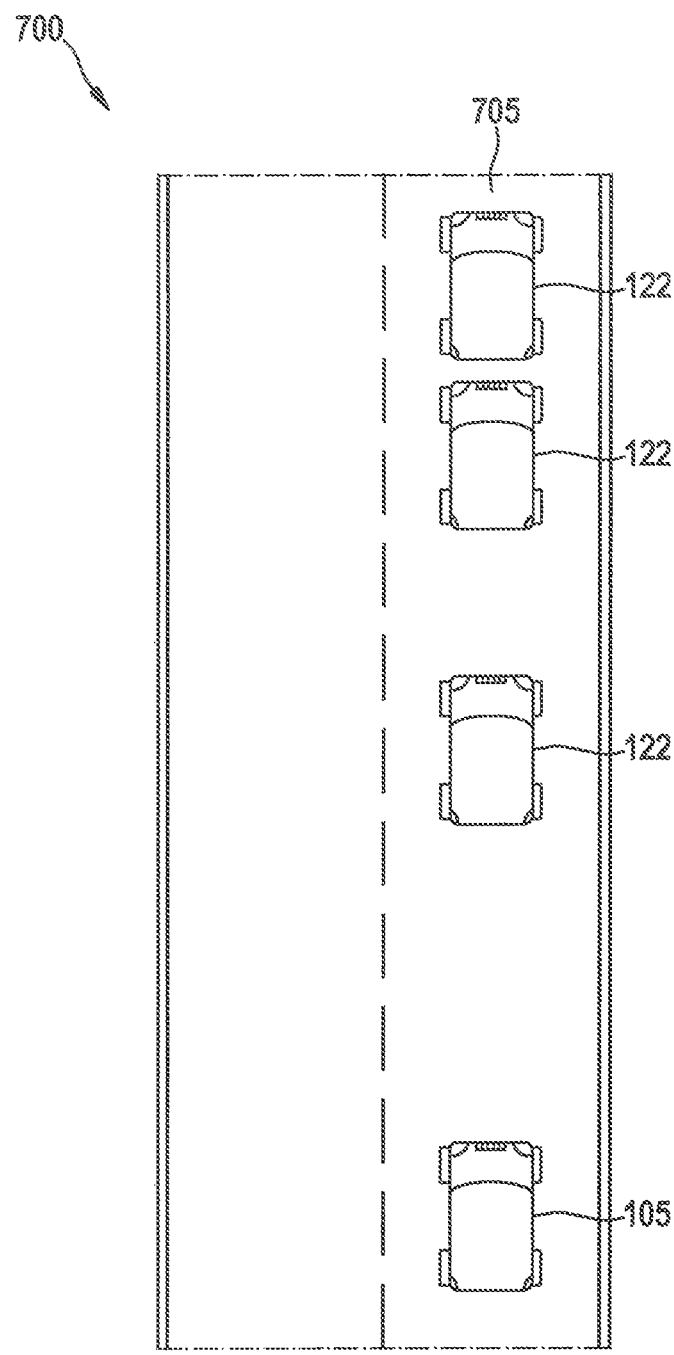

FIG. 7 shows a fifth example 700 for the control of motor vehicle 105 of FIG. 1. Motor vehicle 105 and multiple motor vehicles 122 driving ahead are traveling on a road 705. It is recognized on board of motor vehicle 105 that one of preceding motor vehicles 122, preferably one of motor vehicles 122 farther away, loses speed rapidly or is already standing still. Based on the drop in speed of still further preceding motor vehicles 122, it can therefore be inferred in good time that motor vehicle 105 is approaching the tail end of congestion. The deceleration driving strategy of one of preceding motor vehicles 122 can thus already be adopted early on. As a result, the deceleration operation is able to utilize a longer braking distance, which may enable more even and thus less accident-prone decelerating.

What is claimed is:

1. A method for controlling a host motor vehicle, comprising:
   generating a first driving strategy of the host motor vehicle as a function of a detected environment surrounding the host motor vehicle;
   detecting a second driving strategy of a motor vehicle driving ahead;
   ascertaining whether the first and second driving strategies deviate from one another; and
   depending on results of the ascertaining, controlling the host motor vehicle according to the second driving strategy of the motor vehicle driving ahead including controlling linear and lateral movements of the host motor vehicle so as to emulate linear and lateral movements of the motor vehicle driving ahead.

2. The method as recited in claim 1, wherein driving strategies of multiple target motor vehicles driving ahead are ascertained and the host motor vehicle is controlled according to one of the driving strategies of the multiple target motor vehicles if the multiple target motor vehicle driving strategies correspond to one another and deviate from the first driving strategy of the host motor vehicle.

3. The method as recited in claim 1, further comprising:
supplying a control recommendation for a specified location for one of the host motor vehicle or the target motor vehicle driving ahead, based on the detected second driving strategy of the target motor vehicle driving ahead.

4. The method as recited in claim 1, further comprising:
storing the control recommendation for the specified location; and
subsequently guiding the host motor vehicle on the basis of the stored control recommendation when the host motor vehicle is traveling through the specified location again.

5. The method as recited in claim 1, wherein the second driving strategy of the motor vehicle driving ahead is checked for a risk potential, and the guidance of the host motor vehicle in accordance with the second driving strategy of the motor vehicle driving ahead takes place only if the danger potential is less than a predefined threshold value.

6. The method as recited in claim 5, wherein the first driving strategy relates to a linear control of the host motor vehicle.

7. The method as recited in claim 5, wherein the first driving strategy relates to a lateral control of the host motor vehicle.

8. The method as recited in claim 5, wherein the controlling of the host motor vehicle includes an intervention into at least one of a linear control and a lateral control of the host motor vehicle.

9. The method as recited in claim 1, wherein the controlling of the host motor vehicle includes initiating, by a processing device, an automatic or semiautomatic intervention in linear and lateral control of the host motor vehicle to control the linear and lateral movements of the host motor vehicle so as to emulate the linear and the lateral movements of the motor vehicle driving ahead.

10. The device as recited in claim 1, wherein the controlling of the host motor vehicle includes initiating, by a processing device, an automatic or semiautomatic intervention in linear and lateral control of the host motor vehicle to control the linear and lateral movements of the host motor vehicle so as to emulate the linear and lateral movements of the motor vehicle driving ahead.

11. The method as recited in claim 1, further comprising:
providing information to the driver, via an output device, based on the results of the ascertaining.

12. A non-transitory, computer-readable data storage medium storing a computer program having program codes which, when executed on a computer, perform a method for controlling a host motor vehicle, the method comprising:
generating a first driving strategy of the host motor vehicle as a function of a detected environment surrounding the host motor vehicle;
detecting a second driving strategy of a motor vehicle driving ahead;
ascertaining whether the first and second driving strategies deviate from one another; and
depending on results of the ascertaining, controlling the host motor vehicle according to the second driving strategy of the motor vehicle driving ahead including controlling linear and lateral movements of the host motor vehicle so as to emulate linear and lateral movements of the motor vehicle driving ahead.

13. The non-transitory, computer-readable data storage medium as recited in claim 12, wherein the controlling of the host motor vehicle includes initiating, by the computer, an automatic or semiautomatic intervention in linear and lateral control of the host motor vehicle to control the linear and lateral movements of the host motor vehicle so as to emulate the linear and the lateral movements of the motor vehicle driving ahead.

14. The non-transitory, computer-readable data storage medium as recited in claim 12, wherein the method further comprises providing information to the driver, via an output device, based on the results of the ascertaining.

15. A device for controlling a host motor vehicle, comprising:
a scanning device configured to scan an environment of the host motor vehicle and scan a region of a motor vehicle driving ahead; and
a control unit including a processor configured to (i) generate a first driving strategy for the host motor vehicle as a function of the environment of the host motor vehicle, (ii) ascertain a second driving strategy of the motor vehicle driving ahead based on the scan of the region of the motor vehicle driving ahead, and (iii) control the host motor vehicle according to the second driving strategy of the motor vehicle driving ahead if the first and second driving strategies deviate from one another, wherein the control includes controlling linear and lateral movements of the host motor vehicle so as to emulate linear and lateral movements of the motor vehicle driving ahead.

16. The device as recited in claim 15, further comprising:
an output device to output information to the driver based on results of the ascertaining.

\* \* \* \* \*